United States Patent [19]
Horn

[11] 3,918,418
[45] Nov. 11, 1975

[54] MARINE ENGINE COOLING SYSTEM EMPLOYING A THERMOSTATIC VALVE MEANS AND A PRESSURE RELIEF VALVE MEANS

[75] Inventor: Norman E. Horn, Oshkosh, Wis.
[73] Assignee: Brunswick Corporation, Skokie, Ill.
[22] Filed: Apr. 6, 1973
[21] Appl. No.: 348,661

[52] U.S. Cl. ............ 123/41.08; 123/41.02; 137/469
[51] Int. Cl. .............................................. F01p 7/14
[58] Field of Search ...... 123/41.02, 41.08; 137/469, 137/484.6

[56] References Cited
UNITED STATES PATENTS

| | | | |
|---|---|---|---|
| 2,860,662 | 11/1958 | Gres | 137/469 |
| 2,869,569 | 1/1959 | Kimmell | 137/469 |
| 2,871,877 | 2/1959 | Work | 137/469 |
| 2,888,946 | 6/1959 | Barron | 137/469 |
| 3,105,472 | 10/1963 | Jasper | 123/41.08 |
| 3,323,502 | 6/1967 | Whalen | 123/41.08 |
| 3,422,840 | 1/1969 | Bryant | 137/469 |
| 3,667,431 | 6/1972 | Kueny | 123/41.08 |
| 3,734,170 | 5/1973 | Pace | 123/41.08 |

Primary Examiner—Charles J. Myhre
Assistant Examiner—Daniel J. O'Connor
Attorney, Agent, or Firm—Andrus, Sceales, Starke & Sawall

[57] ABSTRACT

A pressure relief valve for the engine of an outboard motor includes a valve plate connected to a stem and spring loaded water cooling passageway in close spaced relation to a thermostatically controlled valved passageway. The stem extends outwardly through a water discharge chamber directly in communication with the discharge passageway to the lower unit of the motor. A diaphragm is connected to the outer end of the valve stem and is sealed to form a wall of the water discharge chamber. The discharge chamber is normally under a slight water discharge pressure whenever the thermostatic valve is open and thus creates a very slight pressure on the diaphragm which is balanced by the closure spring until such time as the pump pressure within the cooling system is sufficient to overcome the force of the spring. As the relief valve opens, the internal passageway pressure is transmitted to the discharge chamber. This results in the diaphragm rapidly moving outwardly and establishing the full open position of the relief valve. This, in turn, results in a reduction in the internal passageway pressure.

10 Claims, 4 Drawing Figures

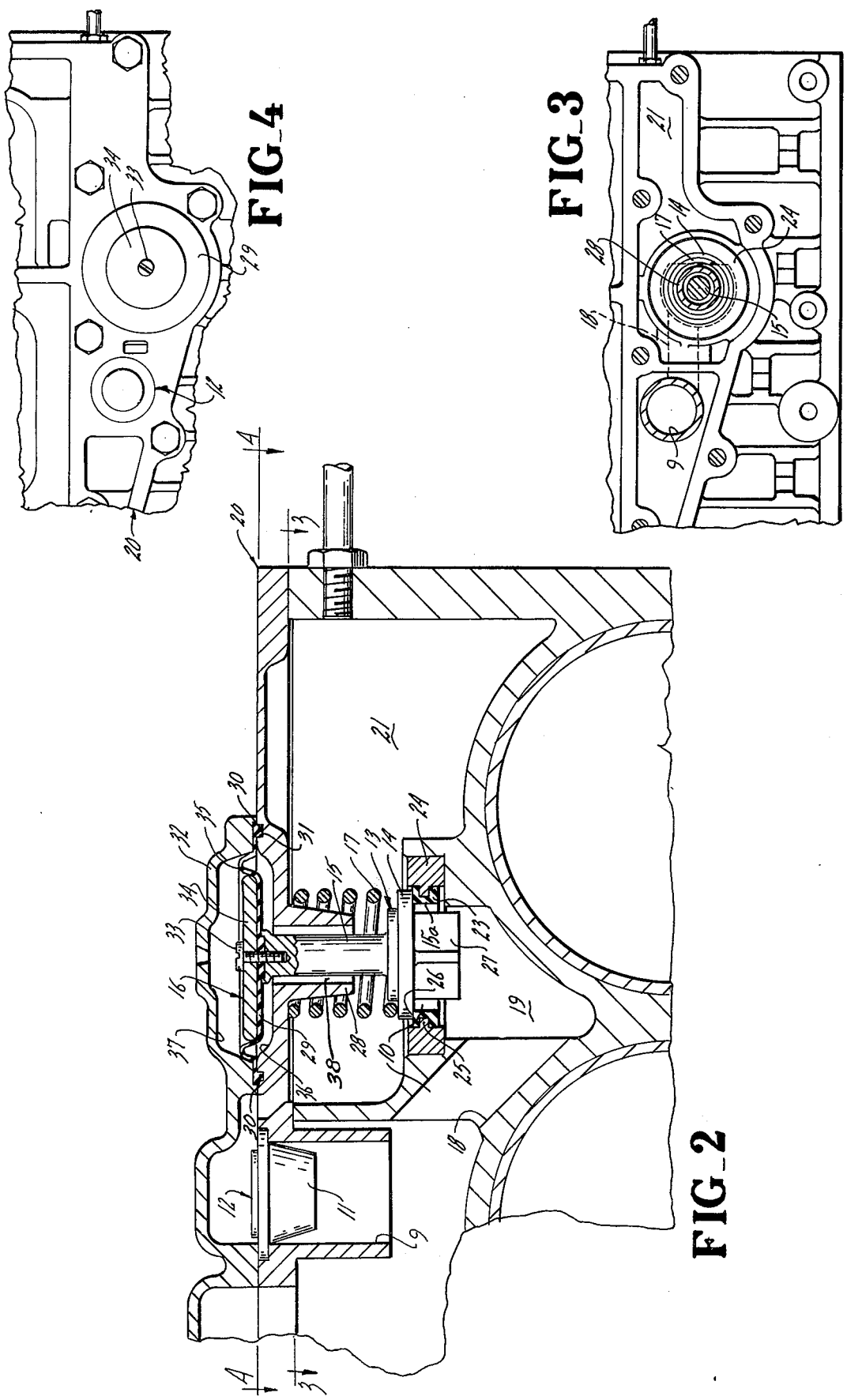

MARINE ENGINE COOLING SYSTEM EMPLOYING A THERMOSTATIC VALVE MEANS AND A PRESSURE RELIEF VALVE MEANS

BACKGROUND OF THE INVENTION

This invention relates to a marine engine cooling system including a thermostatic control and an auxiliary relief valve control of the cooling water flow.

In outboard motors, the engine is generally provided with a cooling system which draws the cooling water from the lake, stream or other body of water within which the motor is operated and returns it thereto. Generally, a pump located within the lower unit is coupled to the drive shaft for continuously drawing water from the water body. During the initial starting and at low speeds, the circulation of the water through the engine is preferably restricted in order to create a quick warm up of the engine and to maintain the engine at a desirable operating temperature. Generally, the escape or return of the cooling water from the circulation jacket about the engine to the discharge passageway means is controlled by a thermostatically regulated valve. As the speed of operation increases, the speed of the water pump correspondingly increases, creating a greater pressure within the cooling jacket and a resulting greater flow of cooling water. At relatively high speeds, however, the thermostatically controlled passageway does not permit the desired transfer of cooling water to maintain a desirable engine temperature. Generally, a pressure responsive relief valve has been provided which opens in response to the higher pump pressures to increase the water circulation and provide greater cooling which maintains more or less optimum tempertures. The pressure relief valves which have been employed are generally spring loaded check valves which produce an opening of the order of ten thousandths of an inch in parallel with the thermostatic valve. Although such systems have been satisfactorily employed, they have been particularly subject to malfunction as a result of contamination. Thus, outboard motors and the like may often be operated in a lake or stream which carries foreign matter such as weeds, debris and the like. As the cooling water is drawn up from this body, foreign matter is also drawn into the cooling system. Some of the material may become lodged within the relief valve preventing adequate sealing, and may further build-up over a period of use to such an extent that the relief valve does not effectively open at high speeds. Thus, normally the relief valves are spring loaded and respond to the increasing pressures to allow opening at a selected speed.

When the engine is operating at a low speed, of course, the valve member is spring loaded to the closed condition. Debris within the valve seat may prevent the complete sealing of the cooling system with leakage flow over and above the flow through the thermostatically controlled opening. Over a period of time the leakage may be such as to result in severely degenerative cooling at idle and low speed.

As a practical matter, the conventional spring loaded relief valve tends to chatter or hunt over a reasonable operating range, thereby trapping and compacting the debris onto the valve seat. As the debris builds up, the valve closure member is correspondingly spaced outwardly of the valve opening.

Eventually the spring loaded valve may be prestressed to a position where the normal opening pressures generated by the pump cannot overcome the additional force on the spring, or the travel of the valve member may be taken up by the trapped debris, and there will be essentially no opening of the relief valve at the desired operating speeds. This not only will result in inefficient cooling but will also increase the pressure within the engine cooling system jacket. The latter increases the stresses on the sealing gaskets and the like and may result in internal block leakage with resulting damage to the engine.

Thus, while pressure relief valves are advantageously employed in cooling systems, they must be carefully constructed and periodically attended to at reasonably close periods in order to ensure completely satisfactory and optimum operation. This, of course, results in an attendant inconvenience, expense and the like and may, of course, result in damage to the engine if the periodic maintenance is overlooked.

SUMMARY OF THE PRESENT INVENTION

The present invention is particularly directed to an improved marine engine coolant pressure relief valve which establishes a very large stroke in response to a selected pressure and minimizes danger of trapping of contaminating or foreign matter within the valve structure. Generally, in accordance with the present invention, a pressure responsive amplifying means is coupled to the pressure relief valve and responds to the initial opening of the relief valve to effect a relatively snap action wide flow opening, with the valve member moving outwardly with a relatively long stroke. This provided ready passage of the foreign material through the relief valve and minimizes possible build-up as a result of trapped foreign matter such as encountered in the relatively small flow passageway heretofore provided. Further, the relatively long stroke of the valve member tends to produce a self-cleaning valve construction. Any debris or foreign matter which is caught within the assembly is whipped and chopped to a fine state by the long, and rapid opening, stroke of the valve member and removed as a result of the flow through the relief valve structure.

In accordance with a particularly novel construction, the pressure relief valve of the present invention is provided with a resilient bias to a closed position in combination with a diaphragm operator which is connected to sense and respond to the water discharge pressure of the system and to provide large, significant movement of the valve at a selected pressure. In a particularly practical construction, a valve member is connected to a stem member and is spring loaded to engage a valve seat formed in the side wall of the water cooling passageway in close spaced relation to a thermostatic valve means. The stem extends outwardly through a water discharge chamber directly in communication with the discharge passageway on the outlet side of the thermostatic valve means. A diaphragm operator is coupled to the outer end of the valve stem and is sealed to form a wall of the water discharge chamber. The outer surface of the diaphragm is exposed to the atmosphere and is normally provided with an outer protective cover. The discharge chamber is normally under a slight water exhaust or discharge pressure whenever the thermostatic valve is open and thus creates a very slight pressure on the diaphragm which is balanced by the closure spring or other suitable resilient means. In operation, the spring will hold the pressure relief valve closed until such time as the pump creates a pressure within the cooling system sufficient to overcome the force of the spring. At that point the relief valve begins to open and transmits the internal discharge passageway pressure to the discharge chamber. This results in the diaphragm operator rapidly moving outwardly and establishing the full open position of the relief valve, which reduces the internal passageway pressure.

In a practical construction, the diaphragm can be readily constructed to produce a stroke on the order of several tenths of inches to establish a very significant relief valve opening. This permits the free passage of contaminating material such as weeds and other debris relatively freely through the valve.

Further, the relatively large stroke, effected by the diaphragm operator or the like, results in a chopping of debris rather than a compacting of the debris against the seat. This results in a destruction of and assistance in the removal of the debris and foreign matter and thus provides an effective self-cleaning function.

The stem arrangement can be constructed to pass through a restricting hub which will function like a relatively small orifice to provide a controlled rate of sensitivity or response. Thus, when the valve moves to the full open position, the orifice does not retard the movement. However, water is trapped within the underside of the diaphragm upon closure movement and will introduce a slight delay in the rate of closing of the valve. Such a construction has not been found necessary but may give a preferred performance for a particular boat or drive arrangement.

The present invention has been found to provide a highly effective pressure relief valve for marine engines and the like which will maintain optimum cooling characteristics with engine operation and particularly over a relatively long life or time period.

BRIED DESCRIPTION OF THE DRAWING

The drawing furnished herewith illustrates a preferred construction of the present invention in which the above advantages and features are clearly disclosed as well as others which will be readily understood from the following description of the illustrated embodiment.

In the drawing:

FIG. 2 is an enlarged vertical section through the relief valve structure shown in FIG. 1;

FIG. 3 is a section taken on line 3—3 of FIG. 2; and

FIG. 4 is a section taken on line 4—4 of FIG. 2.

DESCRIPTION OF THE ILLUSTRATED EMBODIMENT

Figure 1:
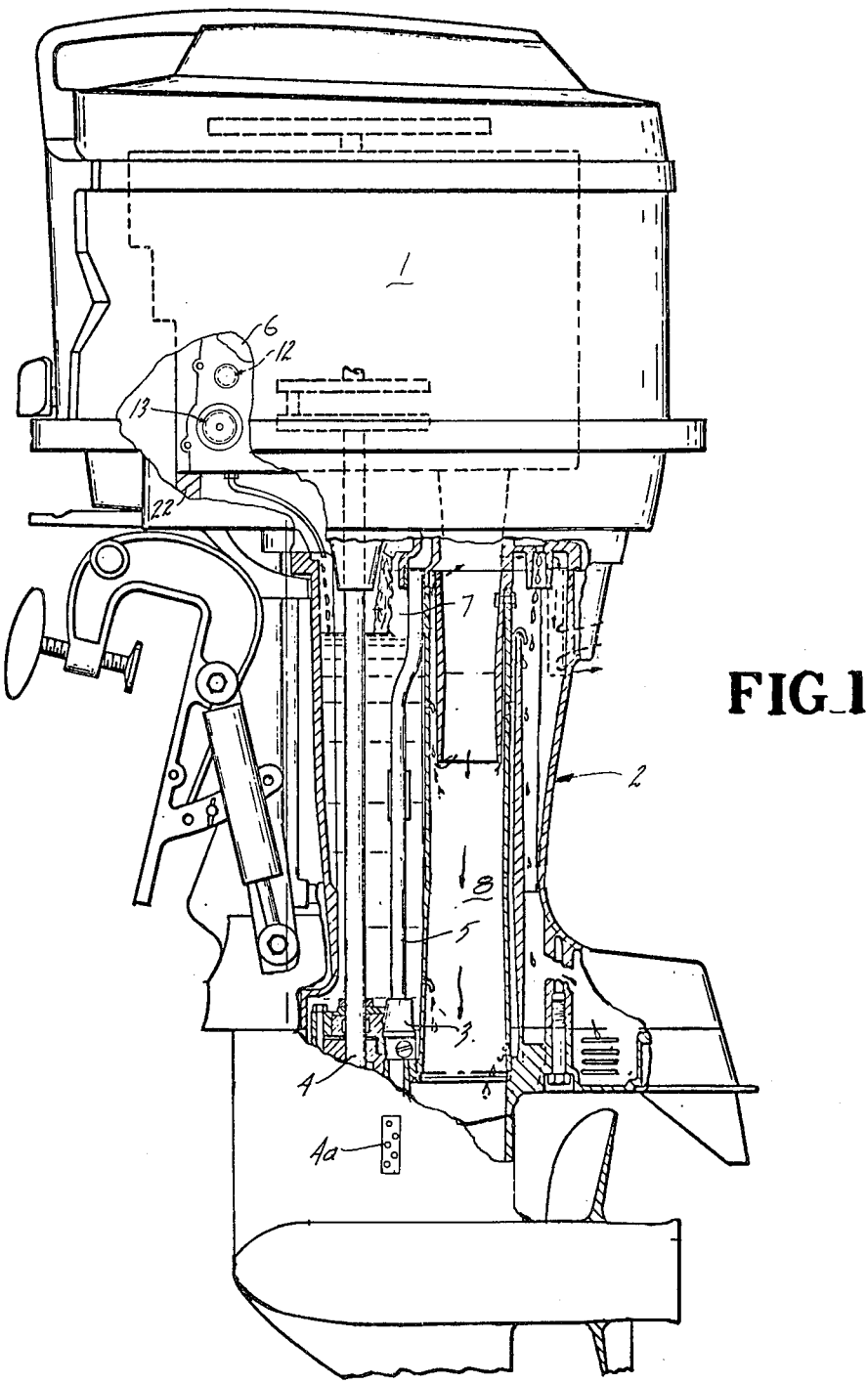
FIG. 1 is a side elevational view of an outboard motor with parts broken away to illustrate a thermostatically controlled valve and a novel pressure relief valve mounted within the water cooling system of an internal combustion engine.

Referring to the drawing and particularly to FIGS. 1 and 2, an internal combustion engine 1 is shown forming an upper part of the power head of an outboard motor. The engine 1 is mounted in the usual manner upon the upper end of a lower drive unit 2. A protective cowl or enclosure is mounted upon the upper end of the lower unit and encloses the engine 1 and the associated components and the like in accordance with the usual construction. The engine 1 is a water cooled engine and in accordance with known construction, a water pump 3 is mounted within an intermediate portion of the lower unit 2 and coupled to the main drive shaft 4 which extends downwardly from the engine 1 through the housing. The pump 3 draws water upwardly through inlet openings 4a in the lower end of the unit 2 from the lake, stream or other body of water within which the outboard motor is being operated. A water tube 5 extends upwardly through the housing and is coupled into a water cooling jacket 6 of the engine 1. Thus, the customary engine block includes a suitable water jacket 6 surrounding the cylinders and having restricted communication with a cylinder head cooling passageway, not shown. The water is passed through the system and discharged downwardly through a water return passageway 7 in the lower unit 2 which surrounds the exhaust passageway 8 and discharges the water back to the original source. At the connection of the engine block cooling chamber to the cooling water return passageway 7 in the lower unit, a pair of separate valved passageways is provided including a thermostatically controlled valved passageway 9 and a pressure relief valved passageway 10. In accordance with known constructions, a thermostat 11 is disposed within the passageway to the engine side and is biased to hold the passageway valve 12 closed until the water about the engine rises to a selected temperature. The valve 12 opens at a selected temperature and then modulates the opening and flow for relatively low speeds. Thus, during the initial starting, the valve 12 seals the discharge passageway 9 and permits rapid increasing of the engine temperature for efficient operation. In order to prevent excessive temperature rise, however, the thermostat 11 then provides a modulated exiting of the cooling water to permit a circulation of cooling water from the pump upwardly through the engine to maintain a warm but not excessively hot engine for smooth running and economy of fuel.

The relief valve passageway 10 includes a pressure relief valve 13 which particularly forms the subject matter of the present invention and a preferred construction is more clearly shown in FIG. 2 and 3. The pressure relief valve 13 is normally closed and is maintained closed until the pressure within the engine cooling jacket rises to a selected pressure level. Thus, as the engine RPM increases, the pump 3 is operated at a corresponding greater speed. This results in an increased pump pressure which is transmitted through the water system to the discharge end of the cooling system and is applied directly to and tends to open the relief valve 13. At a selected pump pressure, the valve 13 opens, thereby increasing the water circulation and the amount of engine cooling to once again prevent excessive temperature rise.

Although such systems have been employed heretofore, the pressure relief valves have created problems requiring significant attention in order to maintain optimum operation. In accordance with the present invention, the pressure relief valve 13 is specially constructed to provide a snap action wide stroke opening which establishes the relatively free flow of water and any foreign matter therein through the relief valve.

Generally in the illustrated embodiment of the invention, shown in FIGS. 2-4, the pressure relief valve 13 of the present invention includes a resiliently loaded valve member 14 overlying a valve seat opening 15a in the discharge end of the cooling passageway and in closely spaced relation to the thermostatically controlled passageway 9. The valve member 14 includes a stem 15 which is connected to a diaphragm actuator 16. Under normal operation, the valve member 14 is held closed by the resilient spring 17. Once the valve member 14 begins to open, however, cooling jacket pressure is transmitted directly through the opening to the diaphragm actuator resulting in a very rapid amplification to establish a snap action movement of the valve member to an essentially full open position. The open position is made relatively large by providing an appropriate stroke to the diaphragm actuator 16 and interconnected valve member 14. In this manner, the unit provides a rapidly opening valve having a very large stroke or opening which permits essentially free movement of normal foreign matter through the cooling system. Further, any chattering or hunting tendency includes a relatively long stroke of the member 14 with a resulting chopping and whipping of the foreign matter through the flowing water resulting in disruption thereof rather than trapping and hammering of the matter onto the valve opening seat.

More particularly, in the illustrated embodiment of the invention, the engine block 1 is formed with the water cooling chamber 6 encircling the manifold assembly and includes a drilled opening 18 through one of the channel walls leading into the discharge passageway 19 formed adjacent the lower end of the engine. A manifold plate 20 is bolted or otherwise secured to the engine block 1 overlying the passageway 19 and defines a final discharge passageway or chamber 21 carrying the heated water from the valved discharge openings 9 and 10 to the water exhaust chamber extending downwardly through an upper plate 22 of the lower unit 2. In accordance with the present invention, the relief valve opening 10 is cast into the engine housing with the spring loaded valve member 14 clamped between the baffle plate 20 and the block 1. An annular valve grommet 23 is located within a cast recess and held therein by a suitable grommet carrier 24 which is press-fitted or otherwise firmly seated within the recess. The inner surface is provided with a radial projection 25 with the sealing grommet 23 secured thereon and defining a flat, valve seat 26 for the valve member 14.

The valve member 14 is a poppet valve plate which rests on the grommet valve seat 26 and includes a depending cruciform guide member 27 extending downwardly through the grommet 23. The stem 15 extends outwardly from the opposite face of the poppet valve plate 14 and through a depending hub 28 formed in the baffle plate 20. The preload spring 17 is a compression coil spring encircling the stem 15 and the hub 28 and acts between the back surface of the poppet valve plate 14 and the aligned surface of the baffle plate 20 to resiliently load the poppet valve and hold it in the closed position.

The diaphragm actuator 16 includes a diaphragm 29 which extends over the hub opening and is provided at its outer peripheral edge with an integral sealing enlargement 30 disposed in an encircling recess 31 in the baffle plate 20. A manifold cover 32 is secured over the baffle plate 20 and includes a planar sealing portion overlying the enlargement 30 to effect a fluid-tight joint with the cover bolted tightly to the engine.

The diaphragm 29 includes a central opening which is secured to the poppet valve stem 15 as by a suitable attachment bolt 33 which extends through the opening in the diaphragm 29 and is threaded into a tapped opening in the stem. A metal piston 34 is disposed between the diaphragm and stem 15 to firmly clamp the diaphragm to the stem and establish simultaneous movement of the diaphragm and valve assembly. The diaphragm 29 preferably includes an intermediate convolution 35 between the stem 15 and washers 34 and the outer peripheral seal 30 to permit relatively unrestricted movement of the diaphragm unit in the axial direction with the poppet valve assembly.

The poppet valve member is preferably formed of a suitable plastic such as an acetal resin which is sold under its trademark DELRIN 100. The washer 34 is preferably formed of a suitable aluminum alloy or the like which is specially treated for corrosion resistance. The upper surface of the baffle plate 20 is provided with a cup-shaped recess 36 inwardly of the seal and concentric of the stem opening and the hub. The cover 32 is also provided with an offset portion 37 overlying the diaphragm 29 to protect the diaphragm while permitting a predetermined outward movement of the diaphragm and interconnected stem, with the cover functioning as a stop, restricting the outward movement of the diaphragm actuator and the interconnected valve plate. The cavity 37 is vented to atmosphere so that the movement of the diaphragm is not restricted.

In the operation of the system, the relief valve plate 14 is normally held in the sealing engagement by the bias spring 17. During initial starting and low speed, the pressure developed by the pump 3 is insufficient to overcome the force of the spring 17 and water flow is controlled by the thermostatically controlled valve 12. The discharge chamber 21 will be at a slight pressure above atmosphere. This pressure acting on the diaphragm 29, however, is insufficient to overcome the force of the spring 17 and, consequently, the relief valve 13 is maintained in the closed position.

As the engine speeds up, the output pressure of the pump 3 increases with a corresponding increase of pressure created in the engine cooling chamber and the passageway 19 to the inlet side of valve 13. Thus, the thermostatic valve 12, even when fully open, does not allow for the completely free passage of the cooling water from the discharge passageway. The back pressure built up within the cooling system is applied to the underside of the valve plate 14. At a selected speed which can be relatively closely regulated, the pressure applied to the plate 14 as well as the slight addition pressure applied to the diaphragm 29 in the discharge passageway 21 overcomes the force of the bias spring 17, causing the relief valve plate 14 to move from the grommet seat 26, and thereby permitting flow through the auxiliary relief valve. This also transmits an increased pressure directly into the discharge chamber 21 which is applied to the underside of the diaphragm 29, thereby increasing the lifting force of further increasing the opening. The system thus provides a regenerative action with amplification of the opening force applied to the relief valve 13 upon initial opening thereof and causes the valve plate 14 to pop to the maximum open position with the stem 15 abutting the cover 32.

In a practical construction, the diaphragm actuator was constructed with a stroke of 0.29 inches between the fully closed and the fully open position shown. This provides a corresponding wide opening of the relief valve passageway 10 and permits esentially unrestricted flow from the cooling water discharge passageway to the final cooling water exhaust passageway. The large opening creates maximum cooling at all engine speeds above a preselected level. Further, the wide, large opening allows essentially unrestricted flow of foreign matter such as seaweed and the like which is widely encoutered in the use of outboard motors. In addition, the very large opening reduces the pressure within the water passageway within the engine, thereby minimizing the internal engine block pressures and internal block leakage.

As the speed is reduced, the poppet valve plate 14 will tend to return to the closed position. Under normal boat operation, the pressure conditions may vary slightly resulting in a reciprocating motion of the poppet valve plate 14. However, it moves through a relatively large stroke and thereby tends to agitate and chop up any debris within the passageway. The cyclical movement of the relief valve plate 14 is also at a relatively low frequency which, in combination with the significant stroke, promotes the self-cleaning of the valve passageway rather than the compacting type action which has been encountered in prior art devices in the conventional spring loaded relief valve. Applicant has found that the present valve structure significantly reduces the tendency to build-up of foreign matter between the valve seat and the valve member and thus produces a very pronounced increase in the effectiveness and satisfactory operating life of the valve.

Although the diaphragm valve structure thus provides some hunting and the like under operating conditions, it is not a high pressure, low stroke chattering condition which would tend to compact and build-up material within the valve but rather is a long stroke, self-cleaning, pumping action which will tend to result in complete removal of the material.

For example, if seaweed or the like moves into the check valve or pressure relief structure, the long stroke tends to pull it rapidly inwardly and spash it downwardly through the relatively long stroke, tending to cause it to disrupt and move out through the valve passageway. This is in contrast to the rapid, small movement hunting or chattering with a resulting hammer or tamping effect of the relatively small opening relief valves heretofore employed which tends to compress and compact the weed within the valve structure.

The relief valve unit 13 can be selected to pop open at any selected speed. It may advantageously be selected to open at a speed related to the speed required to cause the boat to plane. Thus, during the initial starting of the boat, the bow rises significantly. This obviously interferes with the view of the operator and, consequently, the operator will almost automatically accelerate to a position to cause the boat to level out into a planing position. This also provides a convenient transfer speed to maintain efficient engine operation.

The internal diameter of the hub 28 is slightly greater than the diameter of the stem 15 to allow free movement of the poppet valve stem. The close spacement, however, may be selected to define a control passageway or orifice 38 functioning in the manner of an orifice and thereby control the response of the system. The orifice 38 allows relatively free outward movement of the diaphragm unit as a result of the increasing pressure existing in the discharge chanber 21. However, when the diaphragm assembly 16 attempts to return to the closed position shown, the water must move downwardly from the cover passage chamber defined between the diaphragm 29 and the diaphragm recess 36 in the baffle plate 20 through orifice 38. This limits the speed of return and provides a controlled response. Obviously, if such a condition is not desired the system can be readily constructed to completely eliminate the water trapping effect and allow a generally unrestricted return movement.

Various modes of carrying out the invention are contemplated as being within the scope of the following claims particularly pointing out and distinctly claiming the subject matter which is regarded as the invention.

I claim:

1. An internal combustion engine having a cooling jacket means and a pump for circulating coolant through the jacket in accordance with a pressure related to the engine speed, a valve seat means defining an outlet duct for communication between the cooling jacket and a discharge chamber, a pressure relief valve member seated on said valve seat means and resiliently biased to a closed position and providing an initial opening in response to a selected coolant pressure in said jacket, a fluid pressure responsive operator means coupled to said valve member and subjected to the pressure on the discharge chamber side of the valve member said operator including a diaphragm means in said discharge chamber and coupled to said valve member and subjected to the pressure on the downstream side of the valve member and said diaphragm means providing a snap action opening of the valve member in response to initial opening thereof to produce a complete and stable opening of the outlet duct.

2. The engine of claim 1 wherein said valve member has an opening stroke selected to produce a self-cleaning pressure relief valve movement by disrupting and transferring foreign matter through the valve opening.

3. The poppet valve of claim 4 wherein said diaphragm means includes a diaphragm secured between an exhaust baffle plate and an outer manifold cover of said engine, a valve stem secured to said valve member and said diaphragm, said diaphragm being responsive to a selected opening of the valve member to cause such valve member to move to the fully open position and thereby establishing essentially maximum flow of water from the cooling jacket means, said cover limiting the outward movement of said valve stem.

4. The engine of claim 1 wherein said diaphragm means is secured in overlying relationship to the valve member and including a central portion secured thereto, said diaphragm means being formed with an effective area insufficient to overcome the force of the resilient means with the valve member closed, said diaphragm means being responsive to a selected opening of the valve member to cause such valve member to move to said fully open position and thereby establishing essentially maximum flow of water from the cooling jacket.

5. The engine of claim 1 wherein said valve seat means includes a grommet having a flat sealing face in the discharge chamber, said valve member being a plate resting on the sealing face and including a guide means extending downwardly through the grommet, a valve stem integrally formed to the back side of the plate and extending outwardly through the discharge chamber, said operator means including a diaphragm secured to the outer wall of the chamber in overlying relationship to said valve stem, means interconnecting the valve stem to said diaphragm to expose the diaphragm to the water in the discharge chamber, stop means to limit the outward movement of the diaphragm and the interconnected valve stem and valve plate, and a resilient bias spring action between the back side of the valve plate and the aligned opposed surface of the outer wall, said spring resiliently urging said valve plate to a closed position.

6. The engine of claim 5 having an outer cover secured over the diaphragm and being from said valve stem assembly to define said stop means for the outward movement of the valve plate and establishing a movement of the order of tenths of inches to thereby establish a relatively unrestricted opening in response to the initial opening of the relief valve.

7. The engine of claim 1 wherein said operator includes a diaphragm chamber, said diaphragm means includes a diaphragm in said diaphragm chamber and connected in spaced relations to said valve member, and a liquid flow restricting passageway connecting said discharge chamber to the diaphragm chamber.

8. The engine of claim 1 wherein said poppet valve member is a plate resting over the opening to the discharge side of said outlet duct, a valve stem integrally formed to the back side of the valve plate and extending outwardly, an outer plate secured to the engine and including a hub member extending downwardly concentrically over the valve stem and in laterally spaced relation thereto to define a restricted flow passageway, an outer cover secured to the outer plate, said diaphragm means including a diaphragm secured between the cover and the plate in overlying relationship to the valve stem, means interconnecting the valve stem to said diaphragm, said baffle plate and said cover being offset with respect to the position of the diaphragm with the valve plate in the closed position.

9. In an outboard motor an internal combustion engine having a cooling jacket and a cooling pump for withdrawing water from the body of water within which the outboard motor is operating and causing it to circulate upwardly through the cooling jacket and having a discharge passageway to return the water from the cooling jacket to the body of water and a pressure relief valve means in said discharge passageway, said pressure relief valve means comprising an outlet opening from the cooling jacket to the discharge passageway means including a circular grommet secured within the opening by a grommet carrier and defining a valve seat, a poppet valve member including a poppet valve plate resting on the grommet to the discharge side of said opening and including a cruciform guide extending downwardly through the grommet, a valve stem integrally formed to the back side of the valve plate, a manifold baffle plate secured to the engine and including a hub member extending downwardly concentrically over the valve stem and in laterally spaced relation thereto, an outer manifold cover secured to the baffle plate, a diaphragm secured between the cover and the baffle plate in overlying relationship to said valve stem, means interconnecting the valve stem to said diaphragm, said baffle plate and said cover being offset with respect to the position of the diaphragm with the valve plate engaging the grommet to permit restricted movement of the diaphragm to expose the diaphragm to the water in the discharge passageway and to establish limited outward movement of the diaphragm and the interconnected valve stem and valve plate, and a resilient bias spring encircling said hub and valve stem and acting between the back side of the valve plate and the aligned opposed surface of the baffle plate, said spring urging said valve plate to a closed position.

10. The engine of claim 9 wherein said cover is spaced from said valve stem assembly to permit outward movement of the valve plate of the order of tenths of inches to thereby establish a relatively unrestricted opening in response to the initial opening of the relief valve, the length of said stroke being selected to disrupt and transfer foreign matter passing through the valve and thereby produce a self-cleaning pressure relief valve movement.

* * * * *

UNITED STATES PATENT AND TRADEMARK OFFICE
CERTIFICATE OF CORRECTION

PATENT NO. : 3,918,418
DATED : NOVEMBER 11, 1975
INVENTOR(S) : NORMAN E. HORN

It is certified that error appears in the above-identified patent and that said Letters Patent are hereby corrected as shown below:

Column 1, Line 34, cancel "tempertures" and insert --- temperatures ---;

Column 5, Line 17, before "relatively" cancel "a" and insert --- the ---;

Column 6, Line 47, after "slight" cancel "addition" and insert --- additional ---;

Column 6, Line 55, after "force" cancel "of" and insert --- and ---;

Column 6, Line 66, after "permits" cancel "esentially" and insert --- essentially ---;

Column 7, Line 6, after "widely" cancel "encoutered" and insert --- encountered ---;

Column 8, CLAIM 3, Line 37, cancel "poppet valve" and insert --- engine ---; and after "claim" cancel "4" and insert --- 1 ---;

Column 8, CLAIM 4, Line 49, after "and" cancel "including" and insert --- includes ---;

Column 8, CLAIM 5, Line 65, after "said" cancel "operator means" and insert --- diaphragm ---;

Column 9, CLAIM 5, Line 5, after "spring" cancel "action" and insert --- acting ---;

UNITED STATES PATENT AND TRADEMARK OFFICE
CERTIFICATE OF CORRECTION

PATENT NO. : 3,918,418
DATED : NOVEMBER 11, 1975 --continued---
INVENTOR(S) : NORMAN E. HORN It is certified that error appears in the above-identified patent and that said Letters Patent are hereby corrected as shown below:

Column 9, Line 10, after "being" insert --- spaced ---;
CLAIM 6

Column 9, Line 22, before "valve" cancel "poppet".
CLAIM 8

Signed and Sealed this thirtieth Day of March 1976

[SEAL]

Attest:

RUTH C. MASON
*Attesting Officer*

C. MARSHALL DANN
*Commissioner of Patents and Trademarks*